No. 765,538. PATENTED JULY 19, 1904.
J. W. ACKER.
POCKET PILL SAFE.
APPLICATION FILED JAN. 4, 1904.
NO MODEL.
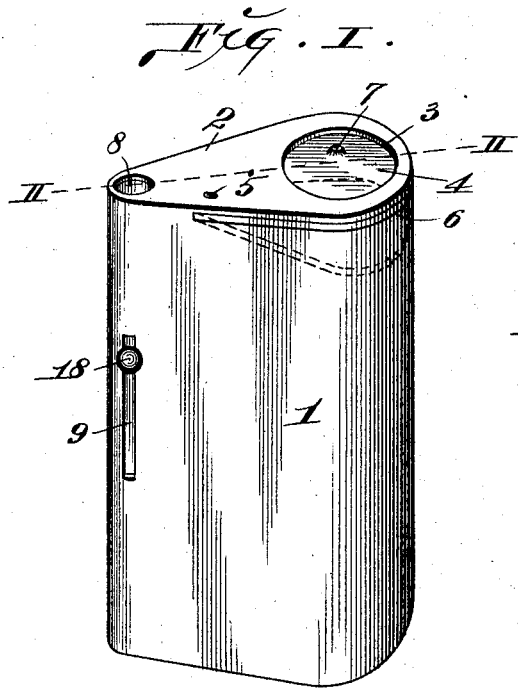
FIG. I.
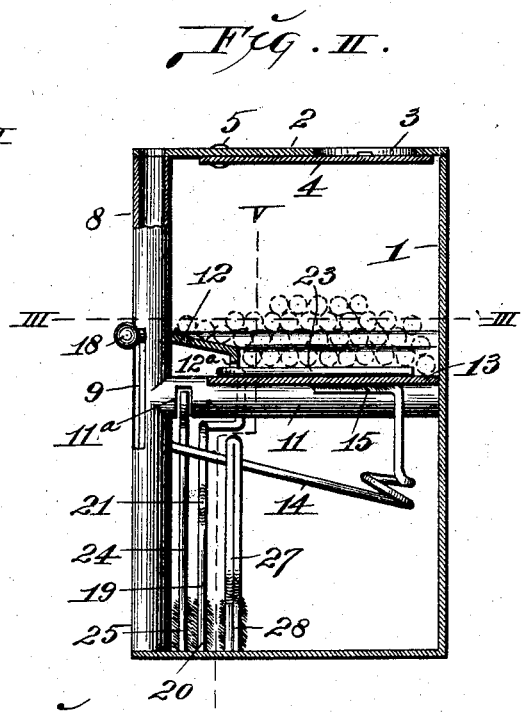
FIG. II.
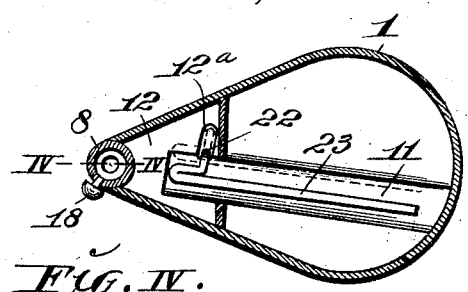
FIG. III.
FIG. IV.
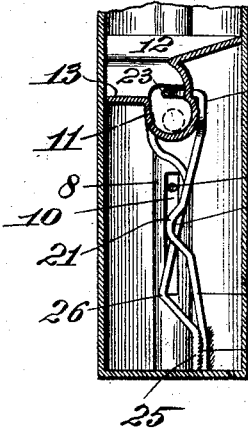
FIG. V.
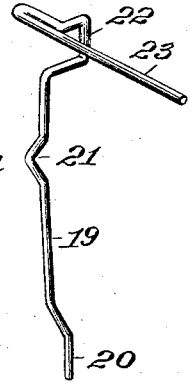
FIG. VI.
Attest.
M. Smith
Blanche Hogan.
Inventor:—
John W. Acker:
By Knight Bro.
Atty's.

No. 765,538. Patented July 19, 1904.

UNITED STATES PATENT OFFICE.

JOHN W. ACKER, OF ST. LOUIS, MISSOURI.

POCKET PILL-SAFE.

SPECIFICATION forming part of Letters Patent No. 765,538, dated July 19, 1904.

Application filed January 4, 1904. Serial No. 187,707. (No model.)

*To all whom it may concern:*

Be it known that I, JOHN W. ACKER, a citizen of the United States, residing in the city of St. Louis, in the State of Missouri, have invented certain new and useful Improvements in Pocket Pill-Safes, of which the following is a full, clear, and exact description, reference being had to the accompanying drawings, forming part of this specification.

My invention relates to a pocket-safe for carrying pills having mechanism therein for discharging the pills singly from the box.

The invention consists in features of novelty hereinafter fully described, and pointed out in the claims.

Figure I is a perspective view of the safe. Fig. II is a longitudinal section taken on line II II, Fig. I. Fig. III is a transverse section taken on line III III, Fig. II. Fig. IV is a longitudinal section taken on line IV IV, Fig. III, and showing the pill-ejector in detail. Fig. V is a longitudinal cross-section taken on line V V, Fig. II. Fig. VI is a perspective view of the agitator in the safe.

1 designates a box of oval shape in cross-section and having a top 2, provided with an inlet-opening 3.

4 is a swinging door that controls the inlet-opening and is pivoted to the box-top at 5. This door is arranged to swing through a slot 6 in the wall of the box 1, and it is provided with a stop 7, that limits its outward movement. At the narrowest edge of the box 1 is a discharge-tube 8, that is provided exteriorly of the box with a longitudinal slot 9 (see Figs. I and II) and interiorly of the box with a longitudinal slot 10. (See Figs. IV and V.)

11 designates a trough extending across the interior of the box 1 and leading to the discharge-tube 9, with which it has communication. This trough is surmounted by a hopper 12, that inclines inwardly from one of the side walls and the forward portion of the box, as shown in Figs. II and V, and is provided with a ledge 13, leading to the trough 11.

14 designates a spring-lever that is fixed to the upper ledge 13 at 15 and the forward end 14' of which extends through the slot 10 in the discharge-tube, as seen in Figs. IV and V.

16 designates an ejector slidably positioned in the discharge-tube 8 and into which the forward end of the spring-lever 14 is fitted, so that when said ejector is moved in a downwardly direction the spring-lever will resist its movement and will when the ejector is freed throw it outwardly, as will be hereinafter more particularly referred to. The ejector is preferably provided at its upper end with a concavity 17, and it has secured to it a finger-piece 18, that operates in the slot 9 of the discharge-tube 8.

19 designates a spring agitator-arm secured to the box-wall of the safe at 20 (see Figs. II and V) and extending upwardly from such point. This agitator-arm is provided with a cam 21, located beneath the spring-lever 14 in the path of its travel, and the upper portion of the agitator-arm is provided with a return-bend 22, that carries a finger 23. The finger of the agitator-arm projects through an opening 12ª in the hopper 12 and extends longitudinally of said hopper to serve therein as means for agitating and stirring the pills in the hopper, so that they will descend into the trough 11 to lie in said trough in an even row in order that they may be delivered from said trough to the discharge-tube 8 without binding against each other while lying in the trough.

24 designates a spring guard-arm that is fixed at 25 to the wall of the box 1 and extends upwardly from such point. This guard-arm is provided with a cam 26, located in the path of travel of the spring-lever 14, so that it will be engaged by said lever in its downward movement. The upper free end of the guard-arm is arranged to operate through a slot 11ª in the trough 11 at its forward end, thereby providing for the movement of the guard-arm into the path of travel of the pills in said trough in order to interpose it between a pill that has passed to the discharge-tube 8 and the remainder of the pills lying in the trough.

27 is a spring-brake fixed to the wall of the box 1 at 28 and having an upper free end that rests against the spring-lever 14 and acts to retard the movement of the lever after the ejector 16 has been moved downwardly and is freed for the ejection of a pill.

In the practical use of my pill-safe the operation is as follows: To remove the pills from the safe, the operator moves the finger-piece 18 downwardly, thereby reciprocating the ejector 16 against the action of the spring-lever 14, the upper end of the ejector being thereby lowered to a position beneath the opening in the discharge-tube 8, providing communication thereinto from the trough 11. When the ejector is so moved a pill passes from the trough into the discharge-tube and rests upon the ejector. In the downward movement of the spring-lever it moves into engagement with the cam 21 of the agitator-arm 19 and swings said arm to one side, so that the finger of the agitator will distribute the pills in the hopper 12 and cause them to descend into uniform position in the trough 11. The continued downward movement of the spring-lever results in said lever engaging the cam 26 of the guard-arm 24, thereby swinging the upper free end of said guard-arm into position between the pill that has passed into the discharge-tube 8 and the other pills that are lying in the trough 11 and preventing forward movement of the pills in the trough at the rear of the guard-arm. The finger-piece is then released, and the spring-lever 14 acts to throw the ejector outwardly, thereby discharging the pill received into the discharge-tube, by which action all the operating parts in the safe are permitted to return to their normal position ready for the next actuation thereof.

I claim as my invention—

1. In a pill-safe, the combination of a box, a discharge-tube forming a part of said box, a spring-controlled ejector in said tube, a trough in said box having communication with said tube, and a hopper surmounting said trough, substantially as set forth.

2. In a pill-safe, the combination of a box, a discharge-tube forming a part of said box, an ejector in said tube, a trough in said box having communication with said tube, and a guard arranged to be moved into said trough to separate the pills therein, substantially as set forth.

3. In a pill-safe, the combination of a box, a discharge-tube forming a part of said box, an ejector in said tube, a trough in said box having communication with said tube, a guard arranged to be moved into said trough to separate the pills therein, and a spring-controlled lever having communication with said ejector; said lever being arranged to engage and move said guard, substantially as set forth.

4. In a pill-safe, the combination of a box, a discharge-tube forming a part of said box, an ejector in said tube, a trough having communication with said tube, an agitator located above said trough, and means for operating said agitator, substantially as set forth.

5. In a pill-safe, the combination of a box, a discharge-tube forming a part of said box, an ejector in said tube, a trough having communication with said tube, an agitator located above said trough, and a spring-lever having connection with said ejector and arranged to engage said agitator, substantially as set forth.

6. In a pill-safe, the combination of a box, a discharge-tube forming a part of said box, a trough in said box having communication with said tube, a hopper surmounting said trough, a spring-agitator arranged to operate in said hopper, and a spring-lever connected to said ejector and arranged to operate said agitator, substantially as set forth.

7. In a pill-safe, the combination of a box, a discharge-tube forming a part of said box, an ejector in said tube, a trough in said box having communication with said tube, a spring guard-finger arranged to enter said trough, a spring-agitator operating above said trough, and a spring-lever connected to said ejector and arranged to operate said guard and agitator, substantially as set forth.

8. In a pill-safe, the combination of a box, a discharge-tube forming a part of said box, an ejector in said tube, a trough in said box having communication with said tube, a spring guard-finger arranged to enter said trough, a spring-agitator operating above said trough, a spring-lever connected to said ejector and arranged to operate said guard and agitator, and a spring-brake bearing against said spring-lever, substantially as set forth.

JOHN W. ACKER.

In presence of—
E. S. KNIGHT,
BLANCHE HOGAN.